United States Patent [19]

Hendrickson et al.

[11] Patent Number: 4,728,950

[45] Date of Patent: Mar. 1, 1988

[54] MAGNETIC SENSOR APPARATUS FOR REMOTELY MONITORING A UTILITY METER OR THE LIKE

[75] Inventors: Max S. Hendrickson, Forest Lake; Gerald M. Kackman, St. Paul; Lawrence R. Konicek, Richfield, all of Minn.

[73] Assignee: TeleMeter Corporation, Minneapolis, Minn.

[21] Appl. No.: 697,000

[22] Filed: Jan. 31, 1985

Related U.S. Application Data

[63] Continuation-in-part of Ser. No. 601,053, Apr. 16, 1984, abandoned.

[51] Int. Cl.$^4$ .............................................. G08C 19/06
[52] U.S. Cl. ........................... 340/870.31; 340/870.02
[58] Field of Search ................... 340/870.31, 870.02; 73/272 A; 324/115, 146, 173, 174, 117

[56] References Cited

U.S. PATENT DOCUMENTS

| | | |
|---|---|---|
| 3,006,712 | 10/1961 | Eichacker . |
| 3,054,095 | 9/1962 | Heller . |
| 3,197,752 | 7/1965 | Rabinow . |
| 3,214,766 | 10/1965 | Baker et al. . |
| 3,307,164 | 2/1967 | Zimmer . |
| 3,500,365 | 3/1970 | Cain . |
| 3,503,044 | 3/1970 | Bonyhard et al. . |
| 3,503,061 | 3/1970 | Bray et al. . |
| 3,508,003 | 4/1970 | Moyers . |
| 3,706,086 | 12/1972 | Farnsworth . |
| 3,778,795 | 12/1973 | Campman et al. ............. 340/870.02 |
| 3,840,866 | 10/1974 | St. Clair et al. ............... 340/870.02 |
| 3,842,208 | 10/1974 | Paraskevakos . |
| 3,842,268 | 10/1974 | Cornell . |
| 3,845,377 | 10/1974 | Shimotori . |
| 3,846,788 | 11/1974 | Calabro et al. . |
| 3,852,726 | 12/1974 | Romanelli . |
| 3,922,490 | 11/1975 | Pettis . |
| 4,007,454 | 2/1977 | Cain et al. . |
| 4,037,219 | 7/1977 | Lewis . |
| 4,041,483 | 8/1977 | Groff . |
| 4,086,434 | 4/1978 | Bocchi . |
| 4,104,486 | 8/1978 | Martin et al. . |
| 4,137,451 | 1/1979 | Einolf, Jr. . |
| 4,138,608 | 2/1979 | Brugger et al. . |
| 4,227,148 | 10/1980 | Smith . |
| 4,241,237 | 12/1980 | Paraskevakos et al. . |
| 4,327,362 | 4/1982 | Hoss . |
| 4,364,011 | 12/1982 | Bloomfield et al. ............ 324/174 |
| 4,375,617 | 3/1983 | Schweitzer, Jr. ............... 324/115 |
| 4,567,763 | 2/1986 | Schiffbauer ................... 324/115 |

FOREIGN PATENT DOCUMENTS

2099260 5/1982 United Kingdom .

Primary Examiner—John W. Caldwell, Sr.
Assistant Examiner—Tyrone Queen
Attorney, Agent, or Firm—Merchant, Gould, Smith, Edell, Welter & Schmidt

[57] ABSTRACT

The present invention relates to a magnetic sensor apparatus (21) for use in a remote meter monitoring system (20) for remotely monitoring the dials (54a–e) of a utility meter (56) by use of Hall Effect devices (40–49). The Hall Effect devices (40–49) are concentrically positioned about the axis of rotation of a pointer member (64) having a permanent magnetic member (66) attached to a free end thereof. The Hall Effect devices (40–49) are axially displaced from the permanent magnetic member (66) and are in alignment with the circumferential path of travel of the permanent magnetic member (66). A microprocessor (68) electrically interconnected to the Hall Effect devices (40–49) selectively drives each of the Hall Effect devices (40–49). The microprocessor (68) further monitors the Hall Effect devices (40–49) and obtains output signals therefrom representative of the angular position of the pointer member (64).

16 Claims, 16 Drawing Figures

| DECODED OUTPUT | HALL EFFECT OUTPUT LEVEL | | | | | | | | | |
|---|---|---|---|---|---|---|---|---|---|---|
| | 9 | 8 | 7 | 6 | 5 | 4 | 3 | 2 | 1 | 0 |
| 9 OR 0 | 0 | 1 | 1 | 1 | 1 | 1 | 1 | 1 | 1 | 0 |
| 0 | 1 | 1 | 1 | 1 | 1 | 1 | 1 | 1 | 1 | 0 |
| 0 OR 1 | 1 | 1 | 1 | 1 | 1 | 1 | 1 | 1 | 0 | 0 |
| 1 | 1 | 1 | 1 | 1 | 1 | 1 | 1 | 1 | 0 | 1 |
| 1 OR 2 | 1 | 1 | 1 | 1 | 1 | 1 | 1 | 0 | 0 | 1 |
| 2 | 1 | 1 | 1 | 1 | 1 | 1 | 1 | 0 | 1 | 1 |
| 2 OR 3 | 1 | 1 | 1 | 1 | 1 | 1 | 0 | 0 | 1 | 1 |
| 3 | 1 | 1 | 1 | 1 | 1 | 1 | 0 | 1 | 1 | 1 |
| 3 OR 4 | 1 | 1 | 1 | 1 | 1 | 0 | 0 | 1 | 1 | 1 |
| 4 | 1 | 1 | 1 | 1 | 1 | 0 | 1 | 1 | 1 | 1 |
| 4 OR 5 | 1 | 1 | 1 | 1 | 0 | 0 | 1 | 1 | 1 | 1 |
| 5 | 1 | 1 | 1 | 1 | 0 | 1 | 1 | 1 | 1 | 1 |
| 5 OR 6 | 1 | 1 | 1 | 0 | 0 | 1 | 1 | 1 | 1 | 1 |
| 6 | 1 | 1 | 1 | 0 | 1 | 1 | 1 | 1 | 1 | 1 |
| 6 OR 7 | 1 | 1 | 0 | 0 | 1 | 1 | 1 | 1 | 1 | 1 |
| 7 | 1 | 1 | 0 | 1 | 1 | 1 | 1 | 1 | 1 | 1 |
| 7 OR 8 | 1 | 0 | 0 | 1 | 1 | 1 | 1 | 1 | 1 | 1 |
| 8 | 1 | 0 | 1 | 1 | 1 | 1 | 1 | 1 | 1 | 1 |
| 8 OR 9 | 0 | 0 | 1 | 1 | 1 | 1 | 1 | 1 | 1 | 1 |
| 9 | 0 | 1 | 1 | 1 | 1 | 1 | 1 | 1 | 1 | 1 |

MAGNETIC SENSOR APPARATUS FOR REMOTELY MONITORING A UTILITY METER OR THE LIKE

This application is a continuation-in-part of U.S. Ser. No. 601,053 filed Apr. 16, 1984 which has been abandoned.

BACKGROUND OF THE INVENTION

The present invention relates generally to a magnetic sensor apparatus for remotely monitoring a utility meter or the like and transmitting the readout therefrom to a central location. More particularly, the present invention relates to a magnetic sensor apparatus for remotely monitoring a utility meter by use of magnetic field responsive elements.

Electric, gas, water or similar meters are typically characterized by a plurality of rotatable gears or shafts which are so interrelated that successive shafts are angularly displaced on a 10 to 1 basis with respect to its neighbor, whereby a direct decimal readout of the meter is enabled by means of indicator pointers which rotate with the several shafts about dials on a faceplate. In a typical power utility installation, for example, periodic reading of the meter is conducted by an individual who inspects the readings at each of the plurality of dials associated with the several shafts of the multistage meter, and thereby may record a direct decimal value.

Within recent years a considerable amount of interest has been generated in automating the readout function of the multistage or "polydecade" meter, as generally described above. Among the reasons that may be cited for such interest is a desire to reduce the cost of manual servicing, and the fact that the meters sought to be read are often in relatively inaccessible places in homes, in factories and in other installations. Moreover, interest is largely centered in providing an automated readout in such a form that said readout may be directly transmitted as, for example, by conventional transmission lines to the utility company or other provider of the services recorded on the meter. Such a result would not only vastly increase the efficiency and speed with which the meter readout process may be available to suppliers, but moreover provides as desired a virtually continuous capability for obtaining such information.

There has been considerable effort expended in providing means and apparatus for reading meters at a distance, for example, through telephone lines and the like. Most of such previous meter readings have required that some internal mechanical or electrical alteration be made to the meter itself, and considerable time and expense is required in putting the altered meter into use. In addition, when such alteration is performed there is the possibility of voiding the meter manufacturer's warranty. Many previous meter reading devices utilize sliding electrical contacts which has prevented their use in explosive atmospheres. Furthermore, in many such metering devices, changes in the output signal have been noted due to the aging of the components which can change the mechanical and/or electrical characteristics.

Other meter reading devices have used photoelectric cells, so that no mechanical connection is needed between the meter and the meter readout. However, these reading devices have not been satisfactory because a reliable source of light must be provided and the face of the photoelectric cell must be kept sufficiently clean so that the light impinging on the photoelectric cell will not be diminished sufficiently to give a false reading.

Furthermore, the data from these systems and many other systems is extremely volatile as they monitor the disk or rotor movement of the meter. Accordingly, any slight disruption or interruption in the monitoring process will result in a complete data loss requiring that the meter be inspected manually to obtain a new start-up reading.

As disclosed in U.S. Pat. No. 3,852,726, a magnetic pointer in cooperation with reed switches is utilized to provide a digital signal representative of the analog-type meter reading. In addition to other problems, this patent does not provide for resolution of ambiguities that might result from positioning of the pointer directly between two reed switches. Also, this patent only provides for a readout at the remote site.

The present invention solves these and many other problems associated with many remote meter monitoring devices.

SUMMARY OF THE INVENTION

The present invention relates to a magnetic sensor apparatus for sensing the angular position of a pointer member fixedly mounted on a rotatable shaft for rotational movement therewith as the shaft rotates about an axis of rotation. The magnetic sensor apparatus includes a permanent magnetic member being interconnected to a free end of the pointer member for rotation with the pointer member about the axis of rotation. The permanent magnetic member has a circumfercential path of travel about the axis of rotation. A circular array of spaced Hall Effect devices are concentrically positioned about the axis of rotation. The Hall Effect devices are axially displaced from the permanent magnetic member of the pointer and are in alignment with the circumferential path of travel of the permanent magnetic member. Control means is operatively interconnected to the Hall Effect devices for selectively driving said Hall Effect devices. Monitoring means is operatively interconnected to the Hall Effect devices for monitoring the Hall Effect devices and obtaining input signals therefrom representative of the angular position of the pointer member.

The present invention contemplates the use of one or more magnetic members of suitable size and strength for rotation in conjuction with the gears in the reducing geartrain of a meter so as to effect changes in magnetic field responsive elements which are unique to a particular range of angular positions.

In one embodiment, equally spaced magnetic field sensitive elements are used in conjunction with a single magnet per dial.

In yet another embodiment of the present invention, a three pole magnet is utilized to provide a more sharply defined magnetic field with reverse divergence and fringing, and as a result, a steeper slope near the edges thereof.

In yet another embodiment of the present invention, the Hall Effect devices are utilized in conjunction with a magnetically soft material for concentrating the magnetic field of the magnet, associated with the pointer member. In one embodiment, the Hall Effect devices are mounted on a washer shaped, planar sheet of magnetically soft material, such as mu-metal.

The present invention is particularly suited to being retrofitted on existing meters with minimum mechanical and electrical alteration. In the preferred embodiment, the standard meter dial pointer is replaced by a dial pointer having a permanent magnetic member attached thereto, the magnetic field sensitive elements being Hall Effect devices. In the preferred embodiment, the elements of the present invention are constructed and arranged so as to enable attachment to the meter faceplate under the meter glass cover.

The present invention is particularly advantageous as it provides for non-volatile monitoring of the meter. Most systems monitor the continuously moving rotor of the meter and are accordingly very volatile, since if the monitoring process is interrupted and data lost, then the meter must be manually read so as to provide a start-up figure or reading. The present invention converts the analog information of the rotating meter dials to digital information for transmission to a central site. Accordingly, if data is lost for whatever reason, another reading can be taken on demand, as required.

Yet another advantage of the present invention is its use of relatively low cost components. The cost to retrofit existing meters is very minimal.

In addition, the present invention utilizes largely proven technology which has a high reliability. The various parts of the present invention have a relatively long life time, many of the parts being sheltered from the weather by the meter glass cover and further being weather resistant.

The present invention minimizes the wiring and electrical installation required at each site. The preferred embodiment utilizes the power lines already present at the meter location as its power source.

The present invention will further provide operability at a wide range of temperatures and environmental conditions.

These and various other advantages and features of novelty which characterize the present invention are pointed out with particularity in the claims annexed hereto and forming a part hereof. However, for a better understanding of the invention, its advantages and objects attained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF THE PREFERRED EMBODIMENT

Figure 1:
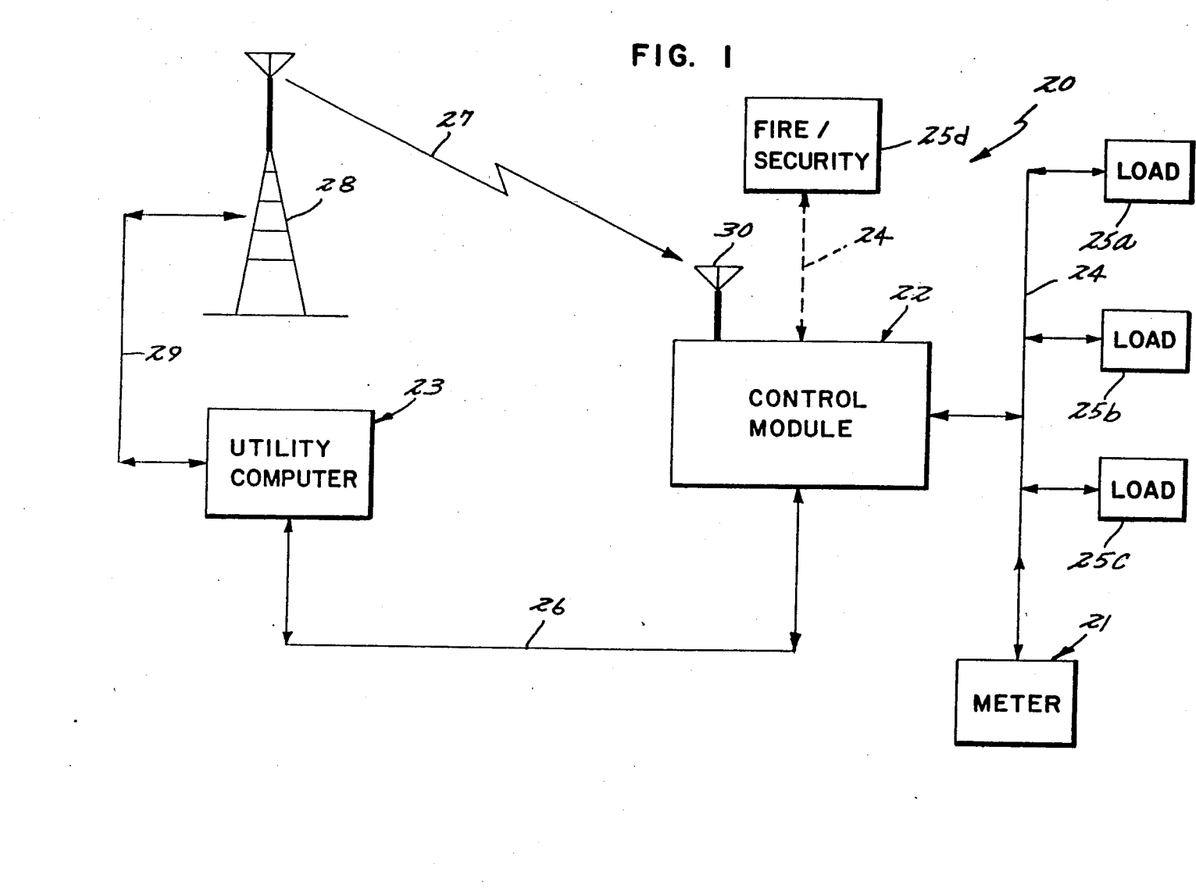
FIG. 1 is a block diagram of an embodiment of a remote meter monitoring system utilizing a magnetic sensor apparatus in accordance with the principles of the present invention.

Referring now to FIG. 1 of the drawings, a block diagram of an embodiment of a remote utility meter monitoring system utilizing a magnetic sensor apparatus in accordance with the principles of the present invention is disclosed, the system being generally designated by the reference numeral 20. The monitoring system 20 shown includes three major elements or subsystems; the magnetic sensor apparatus generally designated by the reference numeral 21, which is mounted over the dials of an existing or newly installed meter for monitoring the movement of the dial pointers of a typical multistage meter; a control module, generally designated by the reference numeral 22, which is typically located inside the home or building where the meter is located and provides communication control between the magnetic sensor apparatus 21 and the utility company's computer, generally designated by the reference numeral 23, which forms the third major element of the system. In an alternate configuration, a single, central control module might be located on or near the utility company's transformer so that all meters on the transformer's secondary are served by one control module. In the embodiment shown, the control module 22 communicates over existing wiring 24 to the magnetic sensor apparatus 21, although this might be accomplished over specially installed cable, etc. As illustrated, the control module 22 might also provide communication to and control of via the power lines 24, other utility devices 25a,b,c such as a fire/security system 25d. The other utility devices 25a,b,c might be user load devices such as water heaters, air conditioners, etc. which can be deenergized or shed from the system under control of the utility company for peak leveling or energy management reasons. This makes the present system a utility load management system in addition to a remote meter reading system. Two-way communication between the control module 22 and the utility company computer 23 is via existing telephone lines 26. An optional approach is to transfer data under/over voice transmission. As further illustrated, an alternate method of communication is via a one-way RF link 27. An FM broadcasting structure 28 or mobile land stations interconnected to the utility company's computer 23 by conventional telephone lines 29 or dedicated lines providing for two-way communication, might be used to broadcast control signals to a receiver 30 at the control module 22 as required. For example, cellular telephones, cable TV networks, satellites, etc. might be used. The utility company's computer 23 might instruct the control module 22 to obtain meter readings on a periodic or demand basis as required. In addition, the control module 22 might be programmed to periodically obtain the meter readings and provide such information to the utility computer 23. The utility computer system 23 might include a front end system for communicating with the control module 22 and obtaining the readout information. The front end system might then at a later time download the meter reading data into the main utility company computer. For example, a front end system might include a microcomputer, a modem, appropriate software, and supporting peripherals and communication lines. Of course, it will be appreciated that the meter reading data may be obtained by several different methods utilizing the principles of the present invention.

As illustrated in FIGS. 2 through 6, the magnetic sensor apparatus 21 of the present invention includes ten Hall Effect devices 40 through 49 arranged in spaced circular fashion concentrically about rotatable shafts 52a–e defining axes of rotation 53a–e, associated with each of the dials or stages 54a–e of a typical multistage, polydecade meter 56 as shown. In the embodiment shown, the Hall Effect devices 40 through 49 are suitably mounted onto the utility meter faceplate 58 by a printed circuit board 60 including a rectangular opening in alignment with all of the dials 54a–e. The Hall Effect devices 40 through 49 are adhesively mounted on a rectangular support member 62 having apertures drilled therein for receipt of the shafts 52a–e and which is suitably affixed to the printed circuit board 60 such that the Hall Effect devices 40 through 49 are concentrically positioned about the rotatable shafts 52a–e. It will be appreciated that alternate embodiments of mounting the Hall Effect devices might be utilized. For example, apertures might be drilled in the printed circuit board itself for receipt of the shafts 52a–e and the Hall Effect devices mounted directly onto the printed circuit board. In addition, the magnetic sensor apparatus 21 includes pointer members 64a–e fixedly attached at one end to the rotatable shafts 52a–e for rotation therewith. The pointer members 64a–e each have mounted at a free end thereof a permanent magnetic member 66. The pointer members 64a–e and their associated permanent magnetic members 66a–e follow a circumferential path about the axes of rotation 53a–e, the Hall Effect devices 40 through 49 being concentrically positioned around each of the axes 53a–e so as to be in register with the circumferential paths of the respective permanent magnetic members 66a–e. The permanent magnetic members 66a–e are further axially removed from the faceplate 58 than are the Hall Effect devices 40 through 49. However, the permanent magnetic members 66a–e are in close proximity to the Hall Effect devices 40 through 49 such that when the permanent magnetic members 66a–e are closely aligned with individual ones of the Hall Effect devices 40 through 49, the magnetic fields of the permanent magnetic members 66a–e will be sensed by the Hall Effect devices 40 through 49 with which it is in close alignment. Ideally, only one of the Hall Effect devices 40 through 49 will sense the magnetic field; however, when the pointer member 64 is disposed between adjacent Hall Effect devices 40 through 49 or directly adjacent with one Hall Effect device 40 through 49, two or more of the Hall Effect devices may sense the magnetic field. In response thereto and in accordance with well known principles, the magnetic field responsive Hall Effect devices 40 through 49 which are in alignment with the permanent magnetic members 66a–e will generate a different output voltage than the Hall Effect devices 40 through 49 not so aligned when an input current is applied. Accordingly, the angular position of the pointer members 66a–e can be readily ascertained and converted into decimal values for use by a digital computer and transmission to a remote site.

Figure 7:
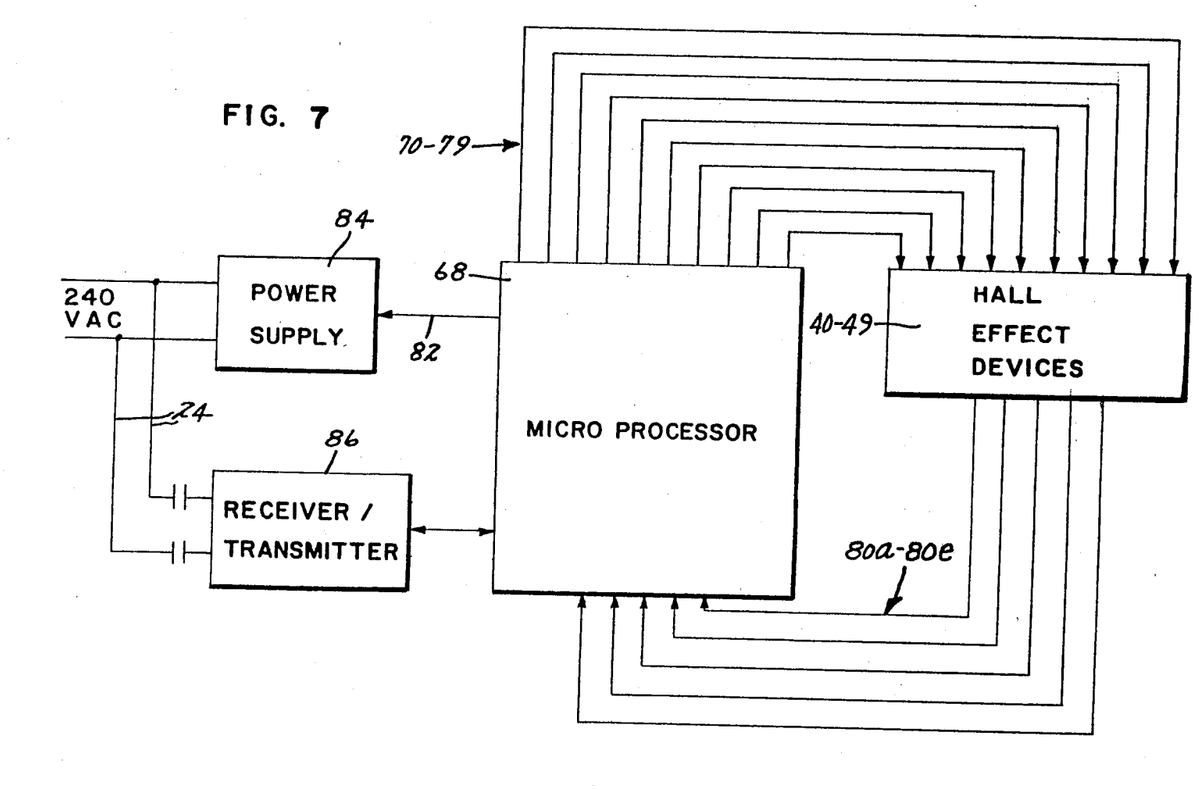
FIG. 7 is a block diagram of an embodiment of control electronics for a magnetic sensor apparatus in accordance with the principles of the present invention.

As further illustrated in FIG. 7, an embodiment of possible control electronics for the magnetic sensor apparatus 21 of the present invention includes a microprocessor 68 electrically interconnected by ten output drive lines 70 through 79 to each of the Hall Effect devices 40 through 49 for driving or applying an input signal to the Hall Effect devices as required during the readout process. In addition, the microprocessor 68 includes five input lines 80a–e interconnected to all of the Hall Effect devices 40 through 49 at each of the dials or stages 54a–e, the input signal lines 80a–e carrying the output signal of the Hall Effect devices 40 through 49. In addition, the microprocessor 68 is suitably interconnected via leads 82 to the conventional 240 volt AC power supply generally found at the meter location, designated by the reference numeral 84. The magnetic sensor apparatus 21 includes receiver/transmitter circuitry 86 for transmitting the readout data and clock information on the existing wiring 24 to the control module 22. It will be appreciated that the microprocessor 68 and the associated electronics might take on any number of configurations and yet enable control of the Hall Effect devices 40 through 49 of the present invention. In particular, the drive line configuration and the input line configuration might be varied.

Figure 8:
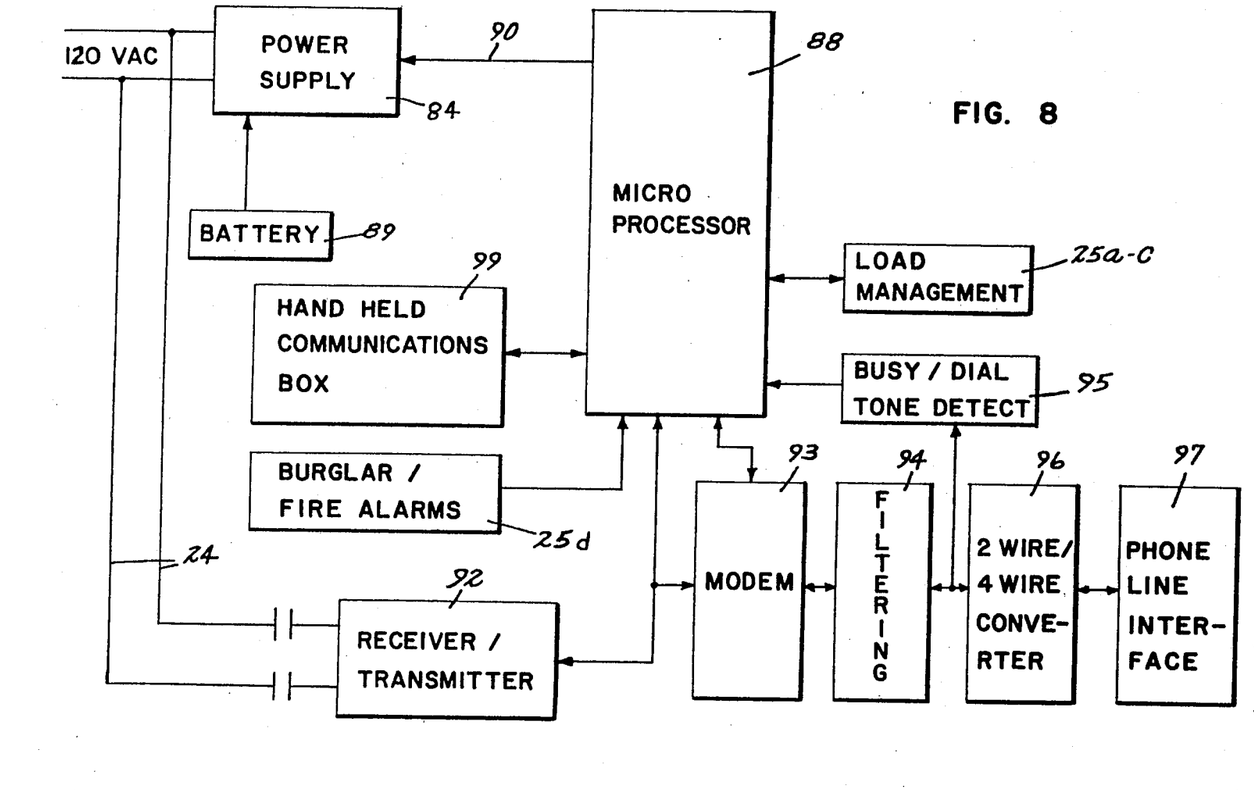
FIG. 8 is a block diagram of an embodiment of a control module of a remote meter monitoring system utilizing a magnetic sensor apparatus in accordance with the principles of the present invention.

Illustrated in FIG. 8 is an embodiment of the control module 22 of the remote utility meter monitoring system 20 shown in FIG. 1. The control module might include a microprocessor 88 interconnected by wiring 90 to the conventional 240 volt AC power supply 84. The power supply 84 might be backed up by a battery 89. The microprocessor 88 might communicate via the existing wiring 24 with the magnetic sensor apparatus 21 by use of receiver/transmitter circuitry 92. As illustrated, a modem 93 might be utilized with appropriate filtering circuitry 94, busy/dial tone detect circuitry 95, converter circuitry 96, and telephone line interface circuitry 97 to enable connection with the utility company's computer 23. It will be appreciated that these elements are off the shelf items and that indeed various configurations and arrangements might be utilized for controlling the magnetic sensor apparatus 21 and communicating with the utility computer 23. As previously mentioned, the control module 22 shown in FIG. 8 might be interconnected to other utility devices 25a–c to provide load management for regulating the utility load at the remote site. In addition, a hand held communications box 99 might be provided to enable a person at the remote site to obtain a reading or test the sensor apparatus 21. Further, as previously indicated, the microprocessor 88 might be interconnected to other sensor or detectors such as burglar or fire alarms 25d.

Figure 2:
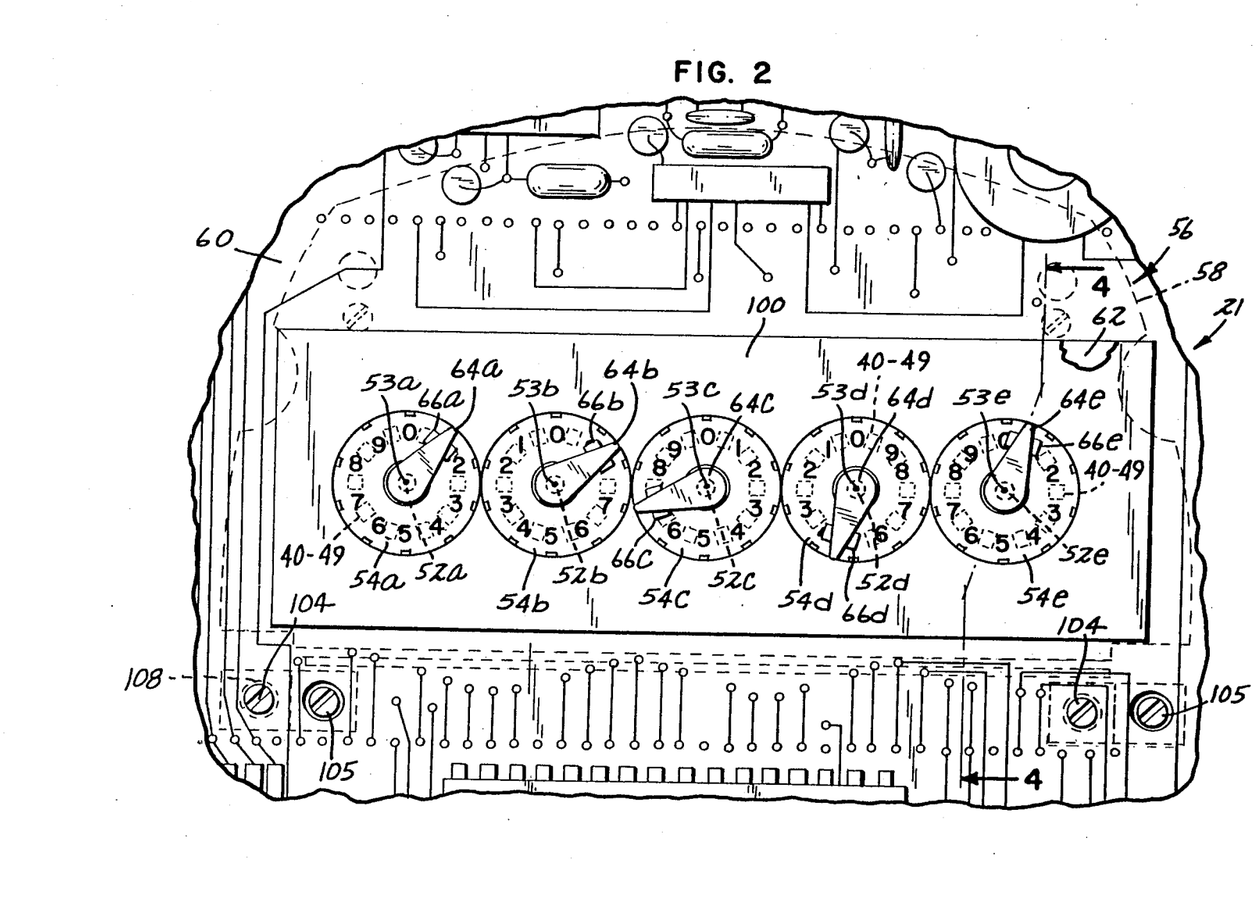
FIG. 2 is a fragmentary elevational view of a meter incorporating an embodiment of a magnetic sensor apparatus in accordance with the principles of the present invention.
Figure 3:
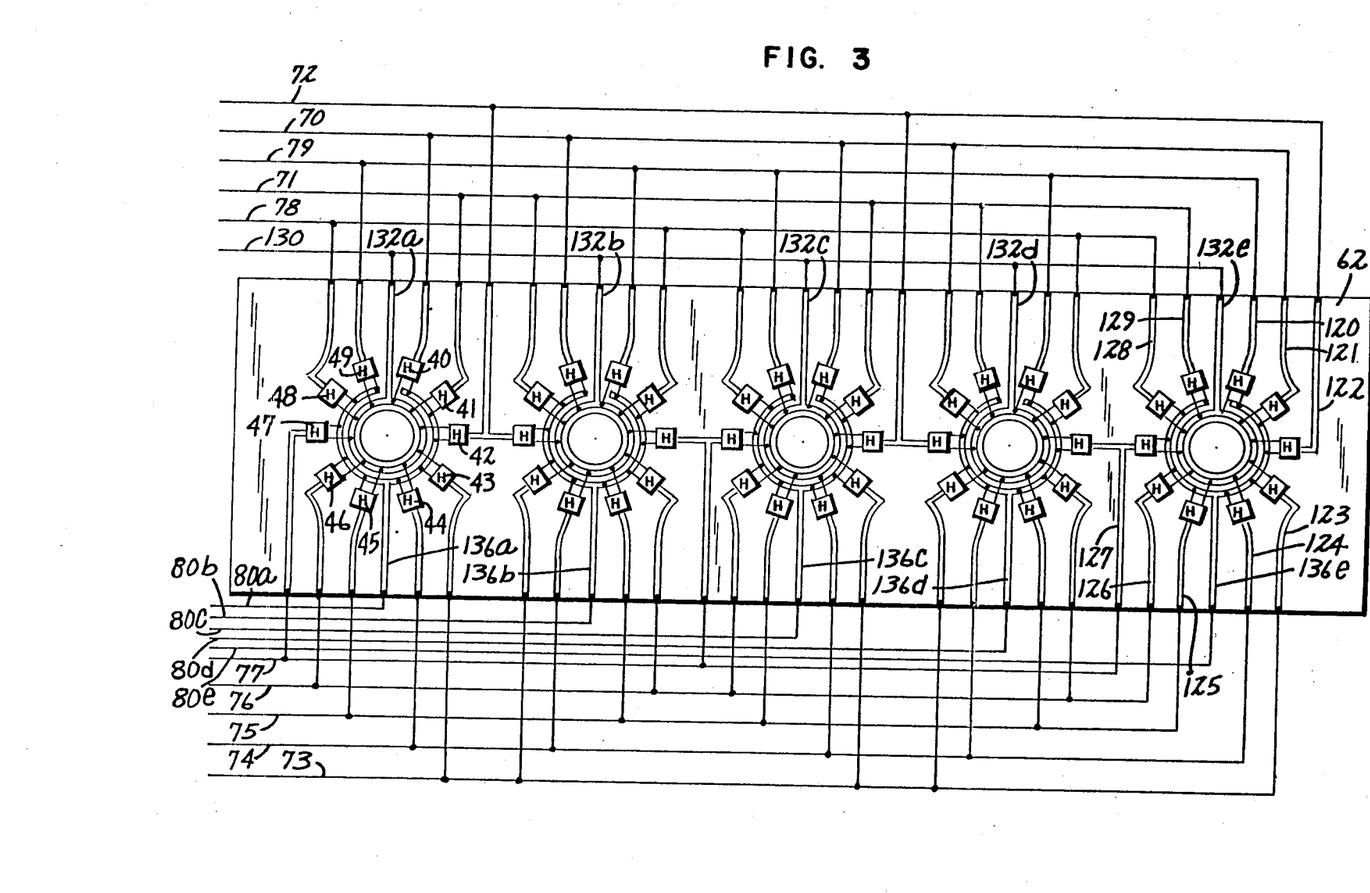
FIG. 3 is an elevational view of a portion of FIG. 2.
Figures 4, 5, 6:
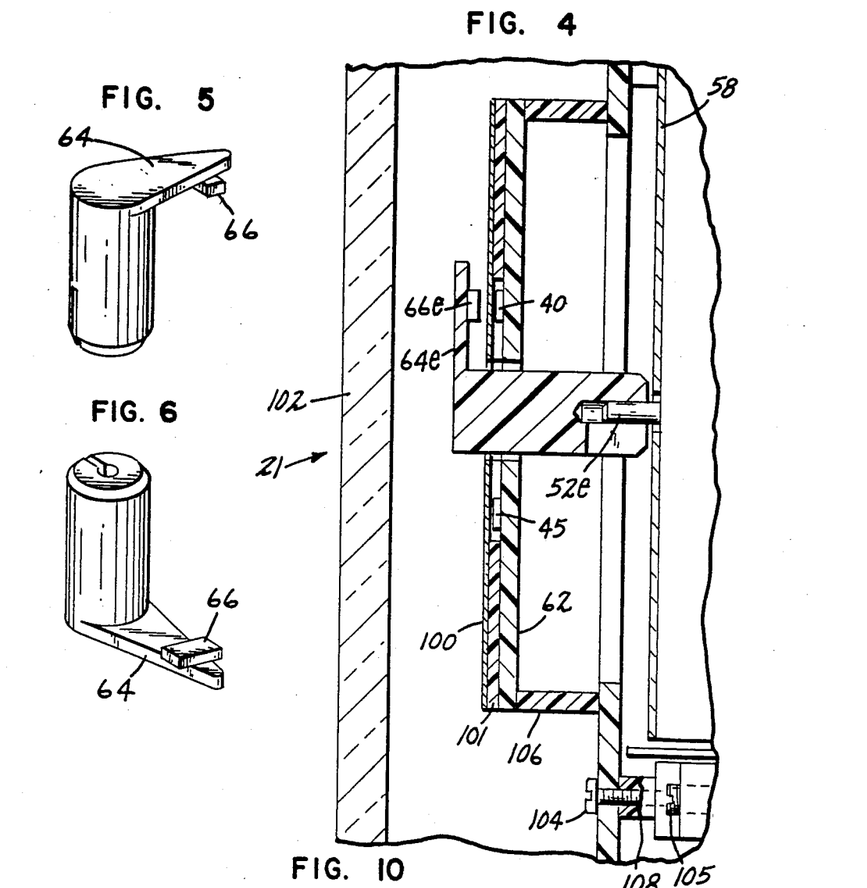
FIG. 4 is an elongated sectional view as seen generally along line 4—4 of FIG. 2.
FIG. 5 is a view in prespective of a pointer member of the embodiment of the magnetic sensor apparatus shown in FIG. 2.
FIG. 6 is a view in prespective of the pointer member shown in FIG. 5 rotated 180 degrees.

More particularly, as illustrated in FIGS. 2 through 3 and 4, the Hall Effect devices 40 through 49 are covered by an adhesive label 100 which serves as a mask having numerals thereon to enable manual inspection and reading of the meter, the sheet of plastic 100 being spaced from the surface of the support member 6 by a spacer element 101. Preferably, most of the elements of the control electronics for the magnetic sensor apparatus 21 will be mounted on the circuit board 60 to enable the entire magnetic sensor apparatus 21 to be installed on the faceplace 58 of the utility meter 56 under an existing or extended glass cover 102 enclosing the faceplate 58 of the utility meter. The printed circuit board 60 might be attached by threaded fasteners 104 to the faceplate 58 to enable easy removal and attachment thereof. The threaded fasteners 104 will preferably be configured and arranged on the printed circuit board 60 to enable use of existing threaded apertures in the meter faceplate 58 such that the meter faceplate 58 need not be modified. Appropriate openings are provided in the printed circuit board 60 for existing meter adjustment screws 105. In addition, spacer members 106 might be utilized to support the member 62 a predetermined distance off the surface of the printed circuit board 60 as necessary. Also, spacers 108 might be positioned between the printed circuit board 60 and the faceplate 58 to maintain a proper space.

Although not illustrated in FIGS. 2-3, the output leads 70 through 79 providing input current to the Hall Effect devices 40 through 49 might be interconnected to conventional connector pins at locations along the edge of the support member 62 and correspondingly to leads 120 through 129 on the support member 62 itself. In order to minimize wiring and multiplexing requirements, the Hall Effect devices 40 through 49 are interconnected to the corresponding leads 120 through 129 in a parallel fashion so that the same Hall Effect devices 40 through 49 of each of the five dials will be driven at any given time. Accordingly, each of the output lines 70 through 79 will serve as a drive line powering five Hall Effect devices, one at each of the dials 54a-e. In addition, the Hall Effect devices driven will have the same relative position with respect to the numerical value of the respective dial. Further, a common ground 130 will be interconnected to ground leads 132a-e on the support member 62 at locations along the edge thereof. All of the Hall Effect devices 40 through 49 at each of the dials 54a-e will be interconnected to the respective common ground leads 132a-e. The input signal lines 80a-e will be interconnected to input leads 136a-e on the support member 62 at locations along its edge.

In operation, as a current is placed on each of the output or drive lines 70 through 79, five Hall Effect devices, one on each dial, will be provided with input current. The microprocessor 68 will then sense the logic levels on the five input signal lines 80a-e from the five Hall Effect devices that are powered or driven by the drive line. Each of the Hall Effect devices 40 through 49 will include an amplifier and Schmitt trigger circuitry so as to provide a binary output. This process is repeated nine more times, sequencing through all ten of the drive lines 70 through 79 until each of the Hall Effect devices 40 through 49 for each dial 54a-e have been sampled.

The resulting signals for each dial are then assembled bit by bit to form a ten bit output code representative of the pointer setting or value of each dial. The ten bit output code must be decoded to a number 0 through 9. The decoding starts on the least significant dial and progresses to the most significant dial.

While only ten Hall Effect devices 40 through 49 are utilized with each dial in the embodiment shown, the magnetic sensor apparatus 21 will preferably provide a resolution of twenty angular positions or settings of the pointer members 64a-e about their respective dials 54a-e such that the magnetic sensor apparatus 21 provides detection of when the pointer member 64 is solidly between two numeral locations about the dial 54. When this condition occurs, the reading is interpreted as the lesser of the two numerals. When the pointer member 64 is lined up with a number, the interpretation of that position depends on the reading of the previous dial. Accordingly, the magnetic sensor apparatus 21 of the present invention includes logic for interpreting the readings obtained from the Hall Effect devices 40 through 49 in order to provide an accurate reading of the dial settings.

Figure 9:
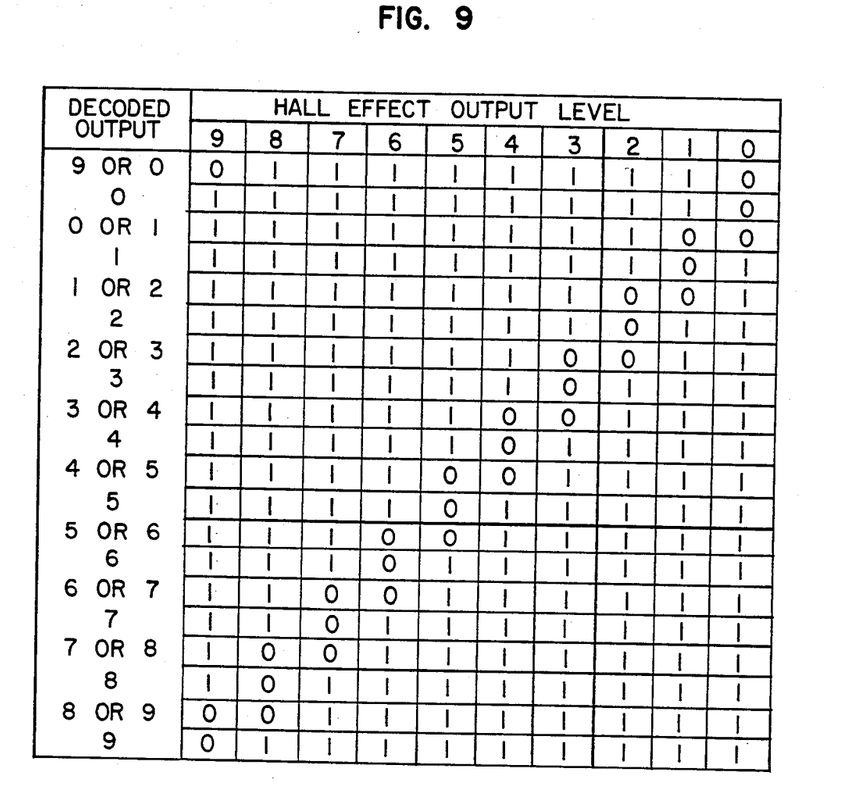
FIG. 9 is a table of valid binary encoded input values according to one embodiment of the present invention.

In the embodiment shown, the ten bit output codes are interpreted as shown in FIG. 9. The bits 0 through 9 of the Figure correspond to Hall Effect devices 40 through 49. When the ten bit code has two low level bits, the decoded output could be interpreted as one of two numbers. If the output is for dial 54e, or the least significant dial, pick the lower of the two possibilities. For dials 52a-d the comparison of the previous dial reading must be made. If the previous dial reading is 0, 1, 2, 3, or 4, the higher of the two possible decoded output is chosen. If the previous dial reading is 5, 6, 7, 8, or 9, the lower of the two possible decode outputs is chosen. If the Hall Effect devices 44 and 45 on the previous dial are 0, the readout is deemed invalid. As illustrated in FIG. 9, in the embodiment shown, the ten bit output code for a dial 54a-e may be of one of 20 possible combinations, as listed. All other codes are considered invalid. When the ten bit output code of dials 54a-d has one low level bit, the reading of the previous dial is checked. If the Hall Effect devices 40 and 49 on the previous dial are 0, the reading is considered invalid. It will be appreciated that this logic assumes the Hall Effect devices 40 through 49 are positioned between adjacent numerals as shown in FIG. 2. If the Hall Effect devices 40 through 49 were aligned with the numerals, then when the pointer was between two numerals, two Hall Effect devices 40 through 49 might be on. In this case, this would be interpreted as the lesser of the two numerals.

The combination of the permanent magnetic members 66a-e and the Hall Effect devices 40 through 49 must provide sufficient magnetic field to insure that at least one, and preferably one or two, Hall Effect devices 40 through 49 are on at any given dial. In yet other embodiments one, two or more Hall Effect devices may be on at any given time; for example, in the table of values illustrated in FIG. 8, where the on comdition is represented by 0; one or two Hall Effect devices may be on at any given time. In the preferred embodiment, the magnetic sensor apparatus 21 uses Hall Effect devices 40 through 49 with two hundred (200) gauss sensitivity and extremely strong "rare earth" magnets with intrinsic magnetizations of sixty-five hundred (6500) gauss. The permanent magnetic member 66 has a length of about $0.15 \times C$ inches where C is the circumference of a circle through the Hall Effect devices 40 through 49 on the dial and is located approximately $0.25 \times S$ inches from the axis of rotation 53, where S is the distance between adjacent dials. The Hall Effect devices 40 through 49 are positioned 36 degrees apart and are spaced such that when the pointer members 64a-e are directly aligned with a numeral on the dial, two of the Hall Effect devices 40 through 49 will detect the magnetic field of the permanent magnetic member 66.

Figure 10:
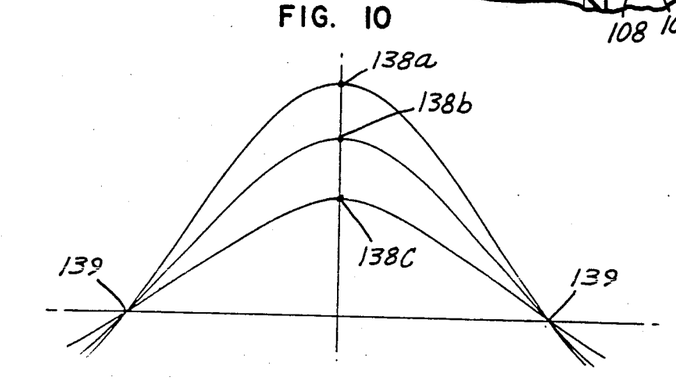
FIG. 10 is a diagrammatic view of magnetic field thresholds.

As illustrated in FIG. 10, the configuration of the magnetic sensor apparatus 21 is preferably such that the magnetic field drops to 0 or below the required Hall Effect device switching threshold value at the same location, represented by reference numeral 139, regardless of slight variations in spacing, represented by reference numerals 138a-c, between the Hall Effect devices 40 through 49 and the permanent magnetic member 66 which might arise as a result of the installation process. In the preferred embodiment, the magnetic field drops to 0 or below the threshold value abruptly at the edges of the permanent magnetic member 66 such that the width of the region over which the Hall Effect devices 40 through 49 can be activated is the same as the width of the permanent magnetic member 66.

It will be appreciated that while use of a permanent magnet is preferred, other magnetic field generating elements might be utilized for rotation with the pointer members. Examples of such magnetic field generating elements are an electromagnet, a solenoid, etc. The permanent magnet approach is preferred over the approaches requiring electrical wiring to the magnetic field generating element, since the permanent magnet eliminates the requirement for electrical leads following the pointer member movement.

Figure 11:
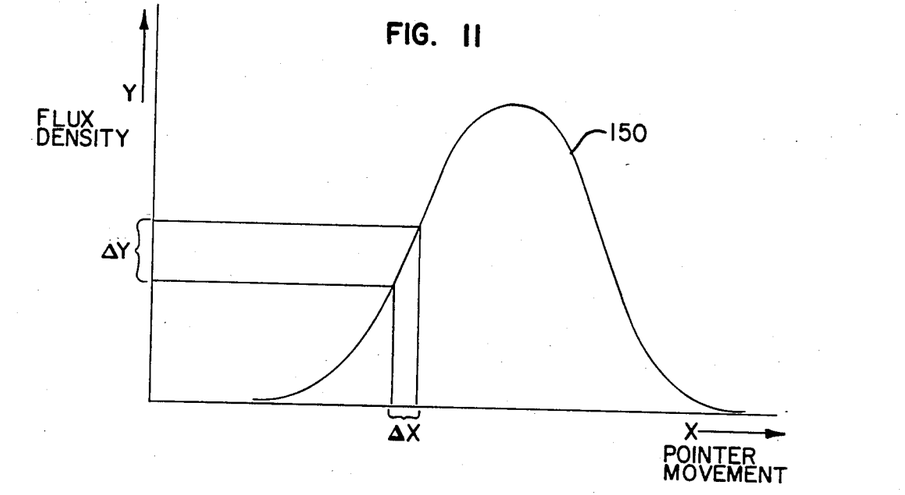
FIG. 11 is a diagrammatic view of a hypothetical bell-shaped curve of a magnetic field.

The applicant has discovered that because of the state of the art in Hall Effect devices and integrated circuits, the magnetic field switching thresholds of the Hall Effect devices cannot be precisely controlled, and furthermore, the magnetic field projected by the permanent magnetic member 56 is not sharply defined, but rather, diverges and fringes near the edges of the magnet. The result is that uncertainties in the switching thresholds in the magnetic field translate into uncertainties in the angular position of the pointer member 64. Illustrated in FIG. 11 is a typical bell-shaped curve 150 representative of the magnetic field pattern created or projected by the permanent magnetic member 66 interconnected to the pointer member 64. As the permanent magnetic member rotates, the Hall Effect devices 40 through 49 detect a magnetic field pattern represented by the curve 150. If there is an uncertainty, delta Y, in the Hall Effect device switching threshold, there will be a corresponding uncertainty, delta X, in the angular position of the pointer member 64. This is illustrated in FIG. 11 wherein the pointer member movement is illustrated along the X axis of the figure.

The uncertainty in the angular position of the pointer member 64 is affected and proportional to the slope of the magnetic field in the threshold region such that the steeper the slope, the smaller the uncertainty in the pointer member position. Ideally, the magnetic field would have a rectangular configuration with infinite slope at the edges. This would result in the uncertainty in the angular position of the pointer member 64 being zero for any switching threshold less than the peak value of the magnetic field. Disclosed hereafter are embodiments of the present invention which cause the magnetic field to be more sharply defined with reduced divergence and fringing and a steeper slope near the edges of the field.

Figure 12:
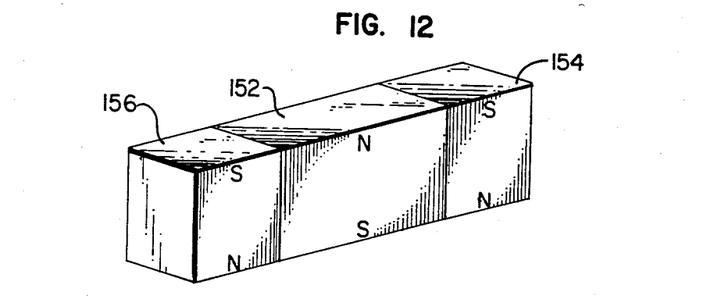
FIG. 12 is a diagrammatic view of an embodiment of a three pole magnet.
Figure 13:
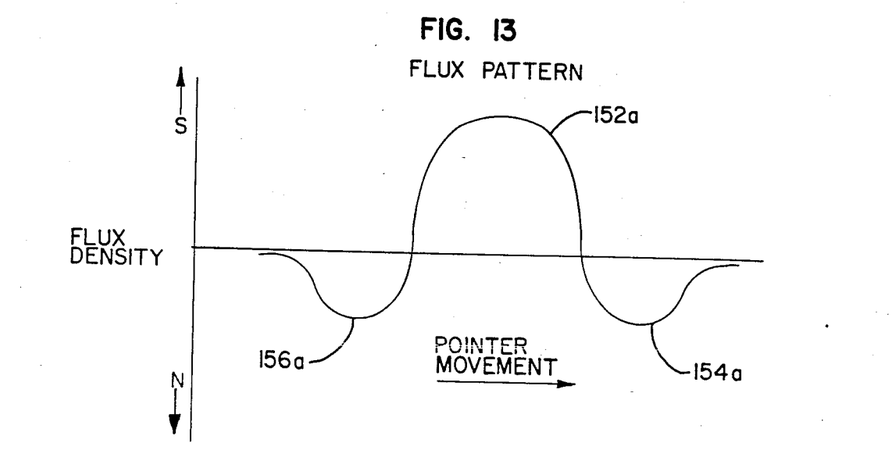
FIG. 13 is a diagrammatic view of a hypothetical resultant magnetic field generated by a three-pole magnet.

As illustrated in FIG. 12, the permanent magnetic member 66 includes a central magnet 152 and two end magnets, 154, 156, respectively. The end magnets 154, 156 are somewhat smaller in size than the central magnet 152 and are arranged such that their magnetic fields 154a, 156a oppose a magnetic field 152a of the central magnet 152 at the edges of the central magnet 152 as generally illustrated in FIG. 13. In the embodiment shown, the Hall Effect devices 40 through 49 detect a north, south, and north field pattern as the magnetic member 66 is rotated with the pointer member 64. The slope of the south pole field 152a is dramatically steeper than it would be without the presence of the end magnets 154, 156. The degree to which there is reduced divergence and fringing depends on the shape, size and material of the end magnets 154, 156 with respect to the shape, size and material of the center magnet 152. The three pole magnet arrangement, an embodiment of which is illustrated in FIG. 12, thus significantly improves the accuracy of the present invention by generating a magnetic field which is more sharply defined and has a steeper slope near the edges thereof.

Figure 14:
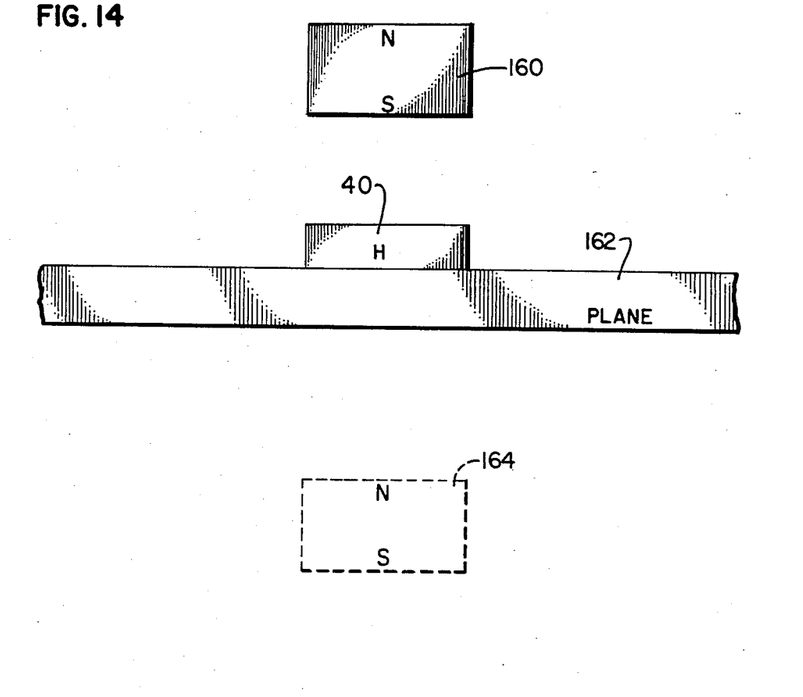
FIG. 14 is a diagrammatic view of a Hall Effect device mounted on a planar arrangement of magnetically soft material.
Figure 15:
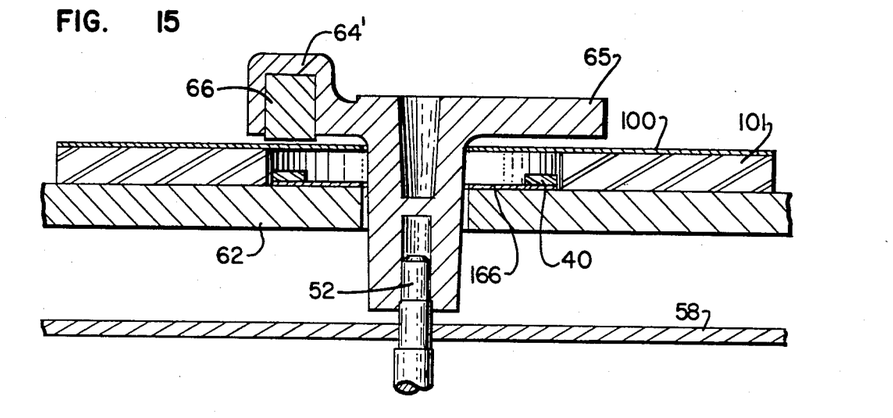
FIG. 15 is a partial, enlarged sectional view of a pointer member arrangement relative to the Hall Effect devices.
Figure 16:
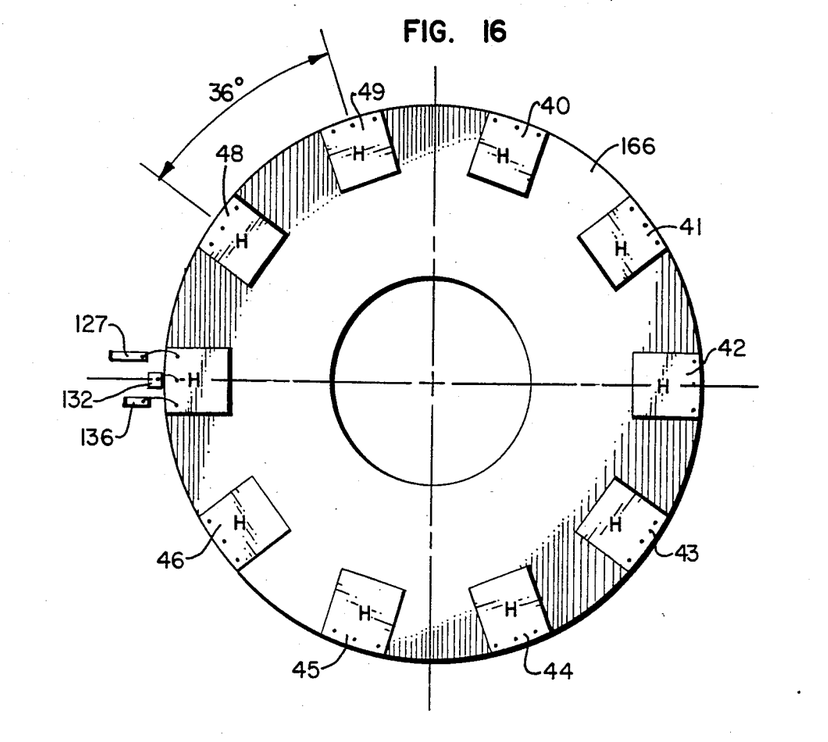
FIG. 16 is a top plan diagrammatic view of the Hall Effect devices mounted on a washer shaped, planar arrangement of magnetically soft material.

Diagrammatically illustrated in FIG. 14 is yet another approach in proving the accuracy of the present invention. In this Figure, a magnetic field generating element 160 such as the permanent magnetic member 66, is illustrated as being positioned over one of the Hall Effect devices 40 through 49. The Hall Effect device 40 is positioned on a plane 162 magnetically conductive soft material, such as mu-metal or steel, which will carry or transmit the magnetic field flux but which is not retentive; i.e., is not a permanent magnet. The planar arrangement of magnetically conductive soft material 162 serves as a magnetic field flux concentrator to guide and shape the magnetic field. The magnetic flux concentrator serves to create an "image" magnet 164 behind the plane 162 in a fashion similar to the action of a mirror. Accordingly, if the magnet 160 is moved, the image 164 will move accordingly. This results in a stronger magnetic field with reduced divergence and fringing near the edges thereof and correspondingly a steeper slope. One embodiment of this approach is illustrated in FIGS. 15 and 16, wherein the Hall Effect devices 40 through 49 are mounted on a washer shaped sheet 166 of mu-metal. This embodiment serves to intensify the magnetic field in the proximity of the Hall Effect devices 40 through 49. It will be noted that as illustrated in FIG. 15, a different embodiment of a plastic pointer member 64' is shown wherein the pointer member includes a cavity on the opposite end from the pointer member tip portion 65 for receipt of the magnetic member 66. The location of the magnetic member 66 is 180 degrees from the tip portion 65 as opposed to on the tip portion as previously disclosed, which provides for less obstruction of the numerals or digits on the dial which are in the vicinity of the tip portion 65. It will be appreciated that in this embodiment, in order to use the algorithm previously discussed and illustrated in FIG. 9, it is necessary to redefine the numbering of the Hall Effect devices such that Hall Effect device 0 refers to the Hall Effect device located between digits 5 and 6 of the dial as opposed to 0 and 1; Hall Effect device 1 refers to the Hall Effect device located between digits 6 and 7, as opposed to 1 and 2, etc.

It will be appreciated that the use of a three pole magnet and the planar arrangement of magnetically conductive soft material might be utilized together to provide even further improvements in the slope of the magnetic field.

Even though numerous characteristics and advantages of the preferred embodiment of the invention have been set forth in the foregoing description together with details of the structure and function of the invention, the disclosure is illustrative only, and changes may be made in detail, especially in matters of shape, size and arrangement of parts, within the principles of the invention, to the full extent indicated by the broad general meaning of the terms in which the appended claims are expressed.

We claim:

1. A magnetic sensor apparatus for sensing an angular position of a pointer member fixedly mounted on a rotatable shaft for rotational movement therewith as the shaft rotates about an axis of rotation, the apparatus comprising:
   (a) a permanent magnetic member being interconnected to a free end of the pointer member for rotation with the pointer member about the axis of rotation, said permanent magnetic member having a circumferential path of travel about the axis of rotation;
   (b) a circular array of spaced Hall Effect devices concentrically positioned about the axis of rotation, said Hall Effect devices being axially displaced from said permanent magnetic member of the pointer, said Hall Effect devices being in alignment with the circumferential path of travel of said permanent magnetic member;
   (c) microprocessor means operatively interconnected to said Hall Effect devices for electrically driving said Hall effect devices, certain of said Hall Effect devices so driven being selectively activated by the proximate position therewith of said permanent magnetic member so as to provide an electrical output signal representative of the angular position of the pointer member;
   (d) said microprocessor means being further operatively interconnected to said Hall Effect devices for monitoring said Hall Effect devices and obtaining said electrical output signals therefrom;
   (e) microprocessor logic means operatively interconnected to said microprocessor means for interpreting said electrical output signals and converting said electrical output signals to a digital value, said microprocessor logic means including pointer location interpretation means for comparing a previous dial reading when two Hall Effect devices are activated so as to interpret a correct location for the pointer; and
   (f) flux concentrator means for concentrating the magnetic field of the permanent magnetic member, a magnetic field of the permanent magnetic member having a steeper slope at its edges in the presence of the flux concentrator means than if the flux concentrator means were not present.

2. The magnetic sensor apparatus in accordance with claim 1, wherein at least ten equally spaced Hall Effect devices are positioned about the circumferential path of said permanent magnetic member, said Hall Effect devices being positioned intermediate of adjacent decimal numeral positions disposed concentrically about the axis of rotation.

3. A magnetic sensor apparatus in accordance with claim 1, wherein said microprocessor logic means includes means for comparing the level of said input signals from all ten of said Hall Effect devices to a table of predetermined values so as to obtain a readout representative of the angular position of the pointer member.

4. A magnetic sensor apparatus in accordance with claim 1, further including control module means electrically connected to the microprocessor means including transmission means for transmitting over telephone lines the angular position of the pointer member to a remote location.

5. A magnetic sensor apparatus in accordance with claim 1, wherein the permanent magnet member includes a three pole magnet comprising a central magnet and two end magnets positioned at opposite ends of the central magnet, the central magnet having a magnetic field associated therewith and the two end magnets each having a magnetic field associated therewith, the magnetic fields of the two end magnets opposing the magnetic field of the central magnet the magnetic field of the central magnet having steeper slope at its edges than if the two end magnets were not present.

6. A magnetic sensor apparatus in accordance with claim 1, wherein the flux concentrator means includes a magnetically conductive soft material in a planar arrangement disposed generally perpendicular to the axis of rotation of the pointer member.

7. A magnetic sensor apparatus in accordance with claim 6 wherein the Hall Effect devices are positioned intermediate of the planar arrangement of magnetically conductive soft material and the permanent magnetic member.

8. A magnetic sensor apparatus in accordance with claim 7, wherein the magnetically conductive soft material is mumetal.

9. A magnetic sensor apparatus in accordance with claim 7 wherein the magnetically conductive soft material is steel.

10. A magnetic sensor apparatus for sensing an angular position of a pointer member fixedly mounted at one end to a rotatable shaft for rotational movement therewith as the shaft rotates about an axis of rotation, said apparatus comprising:
   (a) a permanent magnetic member interconnected to a free end of the pointer member for rotation with the pointer member about the axis of rotation, said permanent magnetic member having a circumferential path of travel about the axis of rotation, said permanent magnetic member further having a magnetic field having a direction associated therewith;
   (b) a circular array of at least ten spaced Hall Effect devices disposed concentrically about the axis of rotation and in alignment with but axially removed from said circumferential path of travel of said permanent magnetic member;
   (c) a support structure for supporting said Hall Effect devices, said Hall Effect devices being axially removed from said permanent magnetic member and mounted on said support structure with a major surface of said Hall Effect devices being perpendicular with respect to the direction of said magnetic field of said permanent magnetic member;
   (d) microprocessor means electrically interconnected to said Hall Effect devices for electrically driving said Hall Effect devices, said Hall Effect devices having a magnetic field sensitive state when so driven, said Hall Effect devices being necessarily configured and arranged with respect to said permanent magnetic member so as to be selectively activated by the proximate alignment therewith of said permanent magnetic member when in said magnetic field sensitive state, said Hall Effect devices so activated providing an output signal representative of the angular position of the pointer member;

(e) said microprocessor means being further electrically interconnected to said Hall Effect devices for detecting said output signal; and (f) microprocessor logic means operatively interconnected to said microprocessor means for interpreting said electrical output signals and converting said electrical output signals to a digital value.

11. A magnetic sensor apparatus for sensing angular positions about axes of rotation of stages of a multistage meter; the apparatus comprising:

(a) a separate magnetic field causing means associated with and being interconnected to each of the stages for rotation with each respective stage about its axis of rotation, said magnetic field causing means having a circumferential path of travel about the respective axes of rotation of the stages;

(b) a separate circular array of spaced Hall Effect devices associated with each of the stages and concentrically positioned about their respective axes of rotation, each circular array of said Hall Effect devices being axially displaced from said corresponding magnetic field causing means said Hall Effect devices being in alignment with the circumferential path of travel of said corresponding magnetic field causing means:

(c) microprocessor means operatively interconnected to said Hall Effect devices for electrically driving said Hall Effect devices, certain of said Hall Effect devices so driven being selectively activated by the proximate position therewith of said corresponding magnetic elements so as to provide electrical output signals representative of the angular position of the stages, (d) said microprocessor means being further operatively interconnected to said Hall Effect devices for monitoring said Hall Effect devices and obtaining said electrical output signals therefrom(.); and (e) microprocessor logic means operatively interconnected to said microprocessor means for interpreting said electrical output signals, said microprocessor logic means including pointer location interpretation means for comparing a previous dial reading under predetermined conditions.

12. A magnetic sensor apparatus in accordance with claim 1, further including transmission means electrically connected to the microprocessor means for transmitting a signal representative of the angular position of the pointer member to a remotely located computing means.

13. A magnetic sensor apparatus in accordance with claim 1, wherein the magnetic sensor apparatus is interconnected to control module means including transmission means for receiving signals from a remotely located computing means and for transmitting the angular position of the pointer member to a remotely located computing means.

14. A magnetic sensor apparatus in accordance with claim 13, wherein said transmission means includes modem means for communicating over telephone lines.

15. A magnetic sensor apparatus in accordance with claim 13, wherein said transmission means includes wireless transmission means for communicating with the remotely located computing means by use of electromagnetic waves.

16. A magnetic sensor apparatus in accordance with claim 10, further including flux concentrating means for concentrating the magnetic field of the permanent magnetic member, the magnetic field having a steeper slope at its edges in the presence of the flux concentrator means than if the flux concentrator means were not present.

* * * * *

UNITED STATES PATENT AND TRADEMARK OFFICE
CERTIFICATE OF CORRECTION

PATENT NO. : 4,728,950

DATED : March 1, 1988

INVENTOR(S) : Hendrickson et al.

It is certified that error appears in the above-identified patent and that said Letters Patent is hereby corrected as shown below:

Column 2, Line 31, "circumfercential" should be --circumferential--.

Column 8, Line 56, "comdition" should be --condition--.

Column 12, Line 18, after "having" insert --a--.

Column 12, Line 32, "mumetal" should be --mu-metal--.

Column 13, Line 27, after "means" insert --,--.

Column 14, Line 4, delete "(.)".

Signed and Sealed this

Third Day of January, 1989

Attest:

DONALD J. QUIGG

*Attesting Officer*

*Commissioner of Patents and Trademarks*